US010805850B1

(12) United States Patent
Benammar et al.

(10) Patent No.: US 10,805,850 B1
(45) Date of Patent: Oct. 13, 2020

(54) HANDOVER IN CONNECTED MODE BETWEEN NON-TERRESTRIAL-NETWORK AND TERRESTRIAL NETWORK

(71) Applicants: Nassir Benammar, Germantown, MD (US); Channasandra Ravishankar, Germantown, MD (US); Gaguk Zakaria, Germaantown, MD (US)

(72) Inventors: Nassir Benammar, Germantown, MD (US); Channasandra Ravishankar, Germantown, MD (US); Gaguk Zakaria, Germaantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/730,896

(22) Filed: Dec. 30, 2019

Related U.S. Application Data

(60) Provisional application No. 62/910,343, filed on Oct. 3, 2019.

(51) Int. Cl.
*H04W 36/00* (2009.01)
*H04W 36/14* (2009.01)
(Continued)

(52) U.S. Cl.
CPC ....... *H04W 36/14* (2013.01); *H04W 36/0058* (2018.08); *H04W 36/38* (2013.01);
(Continued)

(58) Field of Classification Search
CPC . H04W 36/14; H04W 36/0058; H04W 36/38; H04W 88/02; H04W 36/125;
(Continued)

(56) References Cited

U.S. PATENT DOCUMENTS

2015/0382270 A1* 12/2015 Kordybach ............. H04L 43/16
370/331
2016/0142955 A1* 5/2016 Hedberg ........... H04W 36/0061
370/331

(Continued)

*Primary Examiner* — Danh C Le
(74) *Attorney, Agent, or Firm* — Capitol City Techlaw; Jasbir Singh

(57) ABSTRACT

A system and a method for directing a handover of communications in Radio Frequency (RF) networks at a UT. The method includes servicing a user terminal (UT) via a first network having a first coverage area; receiving, from the UT via the first network, a measurement report for a second network having a second coverage area based on a measurement configuration of the second network; sending, to the UT via the first network, a handover order for obtaining service from the second network; and establishing, via a second network RAN (radio access network), a service for the UT via the second network per the handover order. In the method, the first network may include either a terrestrial network (TN) or a non-terrestrial network (NTN), the second network may include other of the TN or the NTN, and the TN and the NTN are RF networks. In the method, the establishing is performed while the UT is disposed in an overlap area of the first coverage area and the second coverage area, and the measurement report may include a RF signal metric of the second network at the UT.

20 Claims, 4 Drawing Sheets

(51) Int. Cl.
*H04W 36/38* (2009.01)
*H04M 1/725* (2006.01)
*H04W 88/02* (2009.01)
*H04W 36/12* (2009.01)
*H04W 36/18* (2009.01)

(52) U.S. Cl.
CPC .... *H04M 1/72519* (2013.01); *H04M 1/72522* (2013.01); *H04W 36/125* (2018.08); *H04W 36/18* (2013.01); *H04W 88/02* (2013.01)

(58) Field of Classification Search
CPC . H04W 36/18; H04W 36/016; H04W 36/007; H04M 1/72419; H04M 1/72522
USPC .......................... 455/436, 438.439; 370/331
See application file for complete search history.

(56) References Cited

U.S. PATENT DOCUMENTS

| | | | |
|---|---|---|---|
| 2018/0270719 A1* | 9/2018 | Chai | H04W 16/28 |
| 2019/0014521 A1* | 1/2019 | Aminaka | H04W 36/14 |
| 2019/0098582 A1* | 3/2019 | MacKenzie | H04W 24/08 |
| 2019/0239132 A1* | 8/2019 | Wallentin | H04W 8/005 |
| 2019/0305838 A1* | 10/2019 | Davydov | H04B 17/318 |
| 2019/0380083 A1* | 12/2019 | Stauffer | H04W 36/0077 |
| 2020/0015135 A1* | 1/2020 | Ericson | H04W 24/10 |
| 2020/0029264 A1* | 1/2020 | Wang | H04W 36/0058 |
| 2020/0045612 A1* | 2/2020 | Stauffer | H04W 24/10 |
| 2020/0077317 A1* | 3/2020 | Sharma | H04W 36/0044 |

\* cited by examiner

HANDOVER IN CONNECTED MODE BETWEEN NON-TERRESTRIAL-NETWORK AND TERRESTRIAL NETWORK

REFERENCE

The present application claims the benefit under 35 U.S.C. 119(e) of U.S. Provisional Application Ser. No. 62/910,343, filed Oct. 3, 2019, which is incorporated herein by reference in its entirety.

FIELD

A system and method to provide service continuity for a User Terminal (UT) between a Terrestrial Network (TN) and a Non-Terrestrial Network (NTN). The NTN may use a Geostationary satellite, a Low Earth Orbit satellites, a High-Altitude platform or a combination thereof.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings disclose a system and method for providing service continuity for a User Terminal (UT) when the UT is subject to handover between a Terrestrial Network (TN) and a Non-Terrestrial Network (NTN).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a non-transient computer-readable storage medium having instructions embodied thereon to perform a method for directing a handover of communications in Radio Frequency (RF) networks at a UT. The method includes servicing a user terminal (UT) via a first network having a first coverage area; receiving, from the UT via the first network, a measurement report for a second network having a second coverage area based on a measurement configuration of the second network; sending, to the UT via the first network, a handover order for obtaining service from the second network; and establishing, via a second network RAN (radio access network), a service for the UT via the second network per the handover order. In the method, the first network may include either a terrestrial network (TN) or a non-terrestrial network (NTN), the second network may include other of the TN or the NTN, and the TN and the NTN are RF networks. In the method, the establishing is performed while the UT is disposed in an overlap area of the first coverage area and the second coverage area, and the measurement report may include a RF signal metric of the second network at the UT. Other embodiments of this aspect include corresponding computer systems, apparatus, and computer programs recorded on one or more computer storage devices, each configured to perform the actions of the methods.

Implementations may include one or more of the following features. The method where the TN may include a cellular communications system. The method where the NTN has a moving coverage area. The method may include disconnecting from the first network after the establishing. The method may include determining that the servicing via the first network is ending as the UT is imminently leaving the first coverage area. The method may include determining that the second network is available or will be imminently available in the first coverage area. The method may include determining that communicating with the UT via the second network benefits a network operator servicing the UT. The method may include preventing hysteresis pursuant to the handover order. When establishing communications via the second network, the servicing of the UT by the first network continues without interruption. When establishing communications via the second network, the servicing of the UT by the first network continues without pause and without replication over the first network and the second network. The measurement report may include a measurement gap and the method further may include pausing the servicing of the UT by the first network during the measurement gap. The measurement configuration may request a management report when a relative movement vector between the UT and an antenna of the first network is non-zero. The measurement configuration may request a periodic measurement report. The measurement configuration may include vertices, and the measurement report may be based on measuring when a location of the UT is within the vertices. The location of the UT may be approximated based on the first coverage area. Implementations of the described techniques may include hardware, a method or process, or computer software on a computer-accessible medium.

One general aspect includes a non-transient computer-readable storage medium having instructions embodied thereon. In one aspect, the non-transient computer-readable storage medium may include a method for a handover of communications in Radio Frequency (RF) networks at a UT. The method includes obtaining a communications service at a user terminal (UT) via a first network having a first coverage area; performing, at the UT, a measurement report for a second network having a second coverage area based on a measurement configuration of the second network; communicating, from the UT, the measurement report of the second network from the UT to a second network RAN (radio access network) via the first network; receiving, at the UT, a handover order for obtaining service from the second network via the first network; and establishing, by communicating with the second network RAN, a service for the UT via the second network per the handover order, where the first network may include either a terrestrial network (TN) or a non-terrestrial network (NTN), the second network may include other of the TN or the NTN, and the TN and the NTN are RF networks, where the establishing is performed while the UT is disposed in an overlap area of the first coverage area and the second coverage area, and where the measurement report may include a RF signal metric of the second network at the UT. Other embodiments of this aspect include corresponding computer systems, apparatus, and computer programs recorded on one or more computer storage devices, each configured to perform the actions of the methods.

Implementations may include one or more of the following features. The method may include determining that the obtaining of the communications service at the UT via the first network is ending as the UT is imminently leaving the first coverage area. The measurement configuration may include vertices, and the performing may include measuring, at the UT, when a location of the UT is within the vertices. After the establishing, the obtaining may include obtaining the communication service at the UT with the first network and the second network. The method may include disconnecting from the first network after the establishing. Implementations of the described techniques may include hardware, a method or process, or computer software on a computer-accessible medium.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1A:
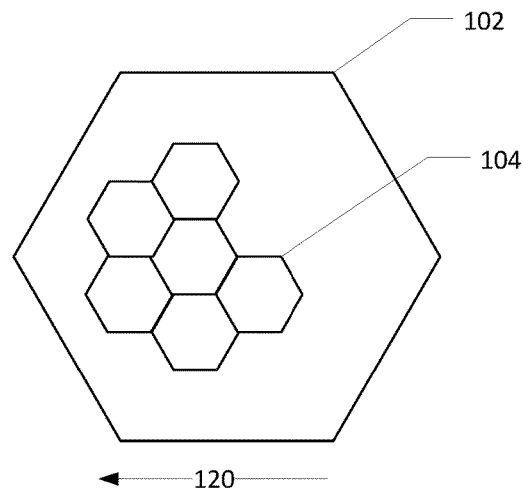
FIG. 1A illustrates a partial TN coverage with an NTN coverage being always present as a fall back according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings are directed to leveraging a lower latency, lower throughput terrestrial transport like a wireless cellular network in conjunction with high throughput, higher latency satellite to create a combined end user low latency and high throughput transport.

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

INTRODUCTION

An exemplary UT may be concurrently covered by one of a TN or NTN. In such a case, no handover is needed. For a handover between the TN and the NTN, at least three coverage scenarios may be considered.

FIG. 1A illustrates a partial TN coverage with an NTN coverage being always present as a fall back according to various embodiments.

Figure 1B:
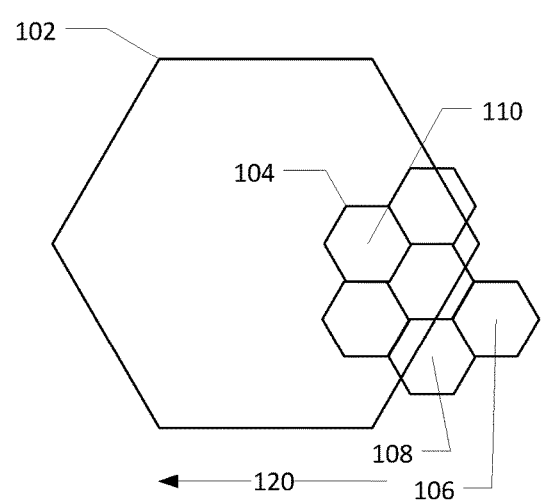
FIG. 1B illustrates a partial but complementary TN and NTN coverage according to various embodiments.

FIG. 1B illustrates a partial but complementary TN and NTN coverage according to various embodiments.

Figure 1C:
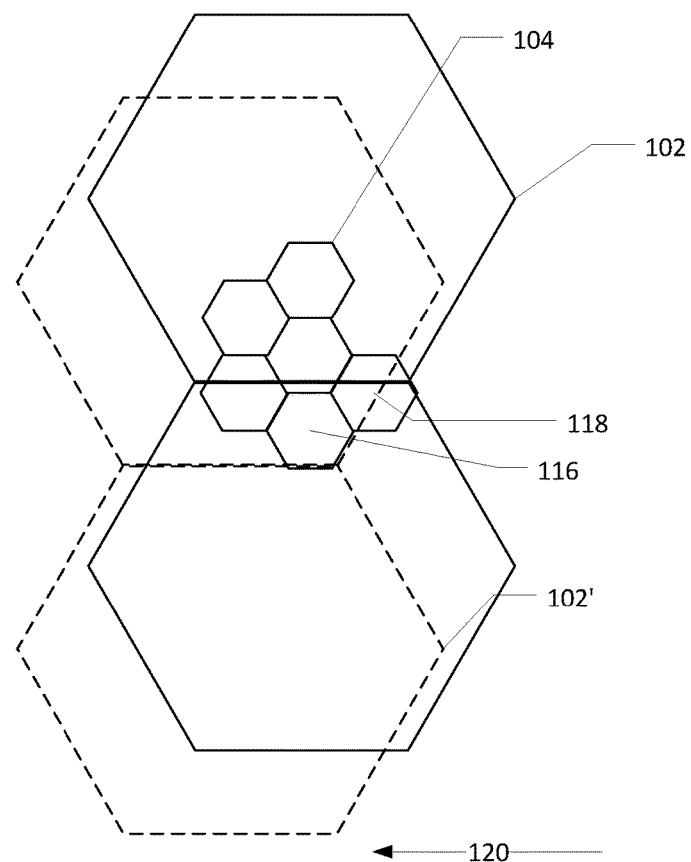
FIG. 1C illustrates a partial but complementary TN and NTN coverage with a moving beam foot print of the NTN coverage according to various embodiments.

FIG. 1C illustrates a partial but complementary TN and NTN coverage with a moving beam foot print of the NTN coverage according to various embodiments.

In FIG. 1A, FIG. 1B, and FIG. 1C TN cells 104 are the smaller hexagons within a TN coverage area, while NTN cells 102 are the larger hexagons within an NTN coverage area. The arrow 120 indicates a direction of travel of a hypothetical mobile UT (not shown) in FIG. 1A, FIG. 1B, and FIG. 1C. The direction of travel is used in the present teachings to anticipate a handover.

In FIG. 1A a coverage area of all the TN cells 104 is also provided coverage by the NTN cell 102.

In FIG. 1B some of the TN cells 104 are also provided coverage by the NTN cell 102 (for example TN cell 110), while some of the TN cells are only partially provided coverage by the NTN cell 102 (for example TN cell 108). Lastly, in FIG. 1B some of the TN cells 104 (for example TN cell 106) are not provided any coverage by the NTN cell 102.

In FIG. 1C, multiple NTN cells 102 are illustrated and a coverage area of the NTN cells 102 moves and covers a different coverage area after some time. The moved NTN cells 102 are illustrated with a dashed line. Some of the TN cells 104 are concurrently provided coverage by different NTN cells 102 (for example TN cell 118), while some of the TN cells 104 are only partially provided coverage by the NTN cell 102 (for example TN cell 116) after movement of the NTN cells 102 coverage areas.

Handover from NTN to TN

For an NTN to handover a UT to a TN, the NTN needs to have some knowledge about coverage provided by the TN, for example, a tower location and an estimate of its coverage. This is akin to having neighboring cell information. This information may be used to decide whether to request a UT under its foot print to do a measurement report for the TN or not.

A Radio Access Network (RAN) service may connect individual UTs to other parts of a network through radio connections by providing access and coordination of the management of resources across the radio sites for the TN, NTN or a combination thereof.

Figure 2:
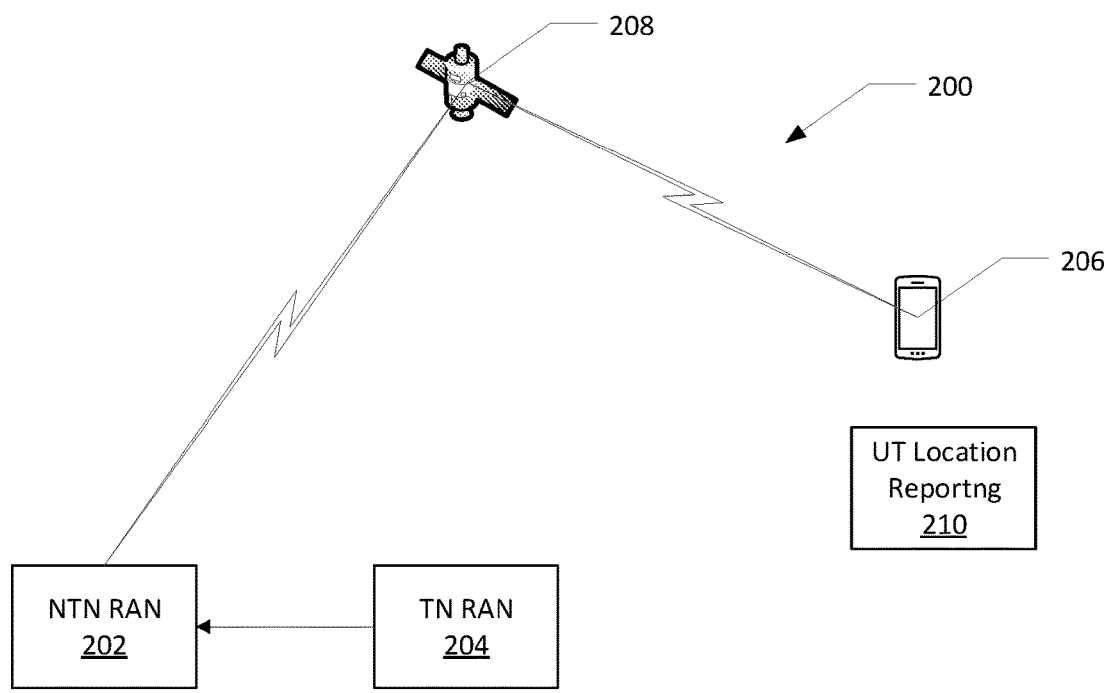
FIG. 2 illustrates a system to provide an NTN to TN handover according to various embodiments.

FIG. 2 illustrates a system to provide an NTN to TN handover according to various embodiments.

A system 200 to provide an NTN to TN handover may include an NTN RAN 202 and a TN RAN 204. A UT 206 may be provided service by a satellite 208. In system 200, any communications to/from the UT 206 are via the satellite 208 with the NTN. Exemplary communications include communications needed by the UT location service 210, and instructions by the NTN RAN 202 to the UT 206 regarding the handover.

A trigger to initiate a handover of a UT 206 from the NTN to the TN may be generated before NTN radio link failure, imminent NTN radio link failure. The trigger may use a UT location provided by the UT location service 210.

Coverage area vertices for the TN may be provided to the UT 206 based on a location of the UT 206. The UT location may be provided by a UT location service 210. In some embodiments, the UT location service 210 may approximate the UT's location based on the beam coverage area of the beam servicing the UT 206. In other embodiments, the UT location service 210 may depend on the UT 206 reporting its location. The UT 206 may use A Global Navigation Satellite Service (GNSS) (such as GPS). The UT Location service 210 may use a reporting configuration based on, for example, periodicity and/or some distance travelled since the last report.

The NTN RAN 202 may decide, based on the UT location and proximity of the UT 206 to neighboring TN cells and coverage, when to instruct the UT 206 to start measurements of a TN signal using a measurement configuration that reflects the TN air interface requirement. The measurement configuration may be preconfigured or be provided by the NTN RAN 202 to the UT 206 dynamically. After receiving a measurement report, the NTN may comply with any measurement gaps and not allocate resources to the UT 206 during those gaps.

When the UT location service 210 does not depend on the UT 206 reporting its location, the NTN may broadcast, for example, in System Information, the vertices of the TN coverage. In one embodiment, only the vertices relevant to the NTN beam coverage need to be broadcast within that beam. A measurement order configuration or measurement configuration can be setup at the UT 206 with an indication that it only applies when the UT 206 is within the broadcasted vertices. Based on this, the UT 206 may start measuring when its position falls within the vertices of the TN coverage without having to share or report its location with the NTN. In some embodiments, the UT 206 may inform the NTN RAN 202 that it has started measurement. This may provide additional information to the NTN RAN 202 regarding measurement gaps. The measurement gaps information may be used by the NTN RAN 202 to start complying with the measurement gaps received from the UT 206. The compliance with the measurement gaps may include pausing service to the UT 206 by the NTN RAN 202 until it has finished measuring, for example, when the UT 206 includes a receiver used by both the NTN and TN, the UT 206 lacks sufficient computation sources to both measure and process service requests for NTN. Lack of this knowledge may result in the NTN RAN 206 complying with measurement gaps all the time even when the UT 206 has not activated measurements and hence loss of throughput.

Handover from TN to NTN

Figure 3:
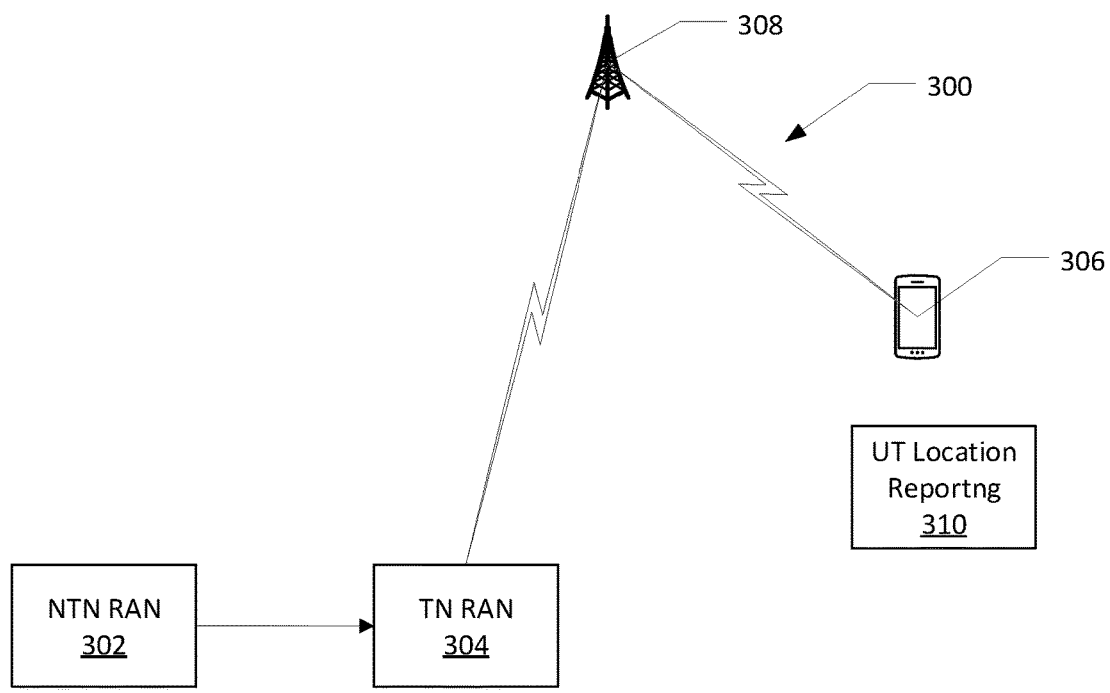
FIG. 3 illustrates a system to provide an TN to NTN handover according to various embodiments.

FIG. 3 illustrates a system to provide an TN to NTN handover according to various embodiments.

A system 300 to provide a TN to NTN handover may include an NTN RAN 302 and a TN RAN 304. A UT 206 may be provided service by a basestation 308. In system 300, any communications to/from the UT 306 are via the basestation 308 with the TN. Exemplary communications include communications needed by the UT location service 310, and instructions by the TN RAN 304 to the UT 306 regarding the handover.

A trigger to initiate a handover of a UT 306 from the TN to the NTN may be generated before TN radio link failure, imminent TN radio link failure. The trigger may use a UT location provided by UT location service 310.

Prior to the TN to NTN handover, a NTN measurement trigger may be sent to the UT 306 when the UT location service 310 reports a low TN cell signal level to the TN RAN 304 and the TN RAN 304 determines that there are no other neighboring terrestrial cell signals to service the UT 306, i.e., an indication of the TN end of coverage. The measurement trigger may be communicated by the TN RAN 304. In some embodiments, the measurement trigger may be based on a UT location that reflects that the UT 306 is located at an edge of coverage.

The NTN measurement configuration may be a time varying configuration as the NTN coverage, beam frequencies or the like may be changing over time. This applies to all NTN systems, for example, LEO or MEO system even when the UT 306 is not mobile and in GEO or HAP systems, when the UT 306 is mobile or when frequency plan changes. The NTN measurement configuration may be time changing when a NTN coverage footprint is moving even when the UT 306 is stationary. The NTN coverage footprint may change for a LEO satellite system or other HAP communication systems. As such, the varying NTN measurement configuration needs to be relayed by the NTN RAN 302 to the UT 306 via the TN RAN 304. The varying NTN measurement configuration is based on the UT location that may been reported by the UT 306 or the position of the TN cell servicing the UT 306. In some embodiments, the measurement configuration may be sent to the UT 306 through a transparent container that is constructed by the NTN RAN 302. The transparent container may be similar to the RBReconfiguration needed for handover and may be tightly coupled with the target beam/cell air interface.

Handover Decisions

A Measurement report and a Reference Signal Received Power (RSRP) (or the like) at a UT may determine whether a handover may be requested from the handover target network, but this may be up to the system and is an implementation choice. TN and NTN have very different requirements, cost per bit, cell/beam load, configured RBs QoS, user subscription and PLMN id priority, etc. As such, the different requirements of the TN and the NTN may be a basis of when to perform a handover. This also applies to the case where UT is serviced by NTN and TN becomes available. In some embodiments, a network operator may decide to implement hysteresis, delay the handover or any other decision that fits with the network operator triggering a handover. A handover from the TN to the NTN may include a NTN connection order being communicated to the NTN RAN and to the UT via the TN. Similarly, a handover from the NTN to the TN may include a TN connection order being communicated to the TN RAN and to the UT via the NTN.

Figure 4:
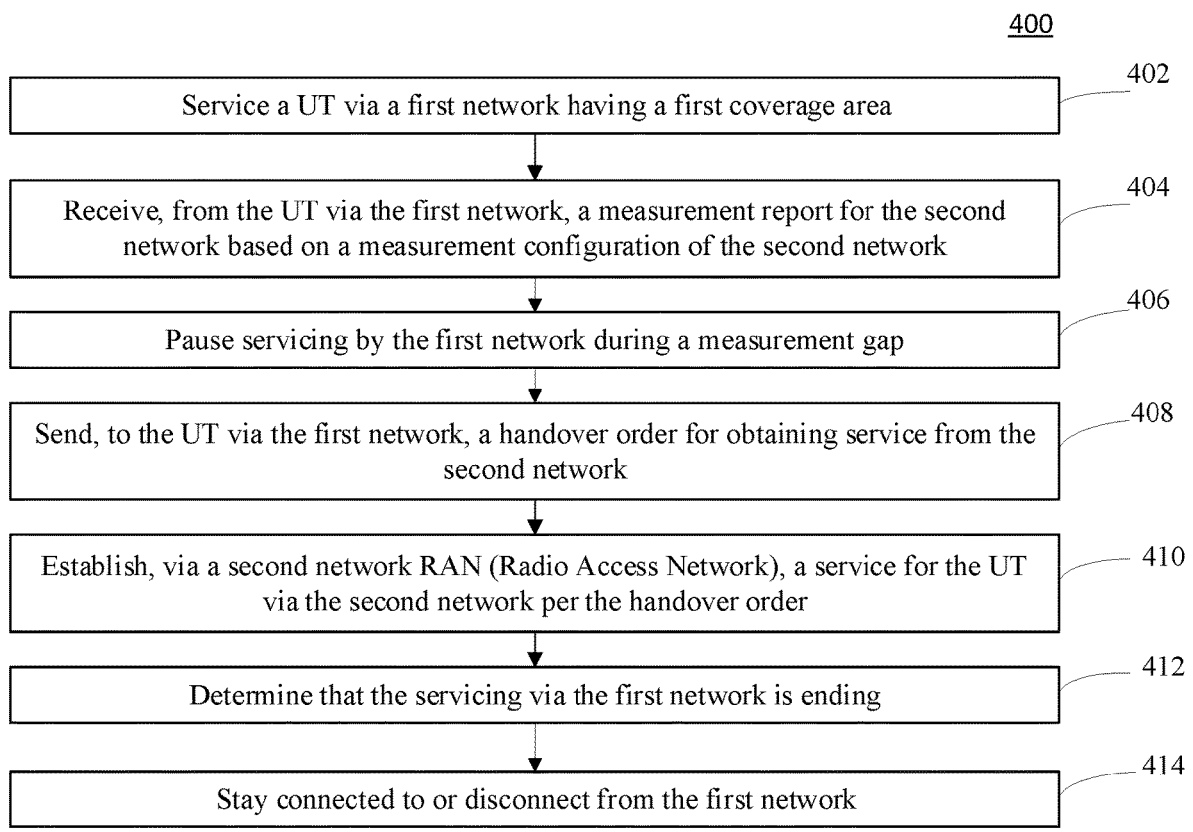
FIG. 4 illustrates a method for directing a handover of communications in Radio Frequency (RF) networks at a UT, according to various embodiments.

FIG. 4 illustrates a method for directing a handover of communications in Radio Frequency (RF) networks at a UT, according to various embodiments.

A method 400 for directing a handover of communications in RF networks at a UT. The RF networks may include a TN and an NTN. The method 400 may further include operation 402 to service a UT via a first network having a first coverage area. The method 400 may further include operation 404 to receive, from the UT via the first network, a measurement report for the second network based on a measurement configuration of the second network. The method 400 may further include operation 406 to pause servicing by the first network during a measurement gap. The method 400 may further include operation 408 to send, to the UT via the first network, a handover order for obtaining service from the second network. The method 400 may further include operation 410 to establish, via a second network RAN, a service for the UT via the second network per the handover order. The method 400 may further include operation 412 to determine that the servicing via the first network is ending. The method 400 may further include operation 414 to stay connected to or disconnect from the first network at a network operator's discretion.

Figure 5:
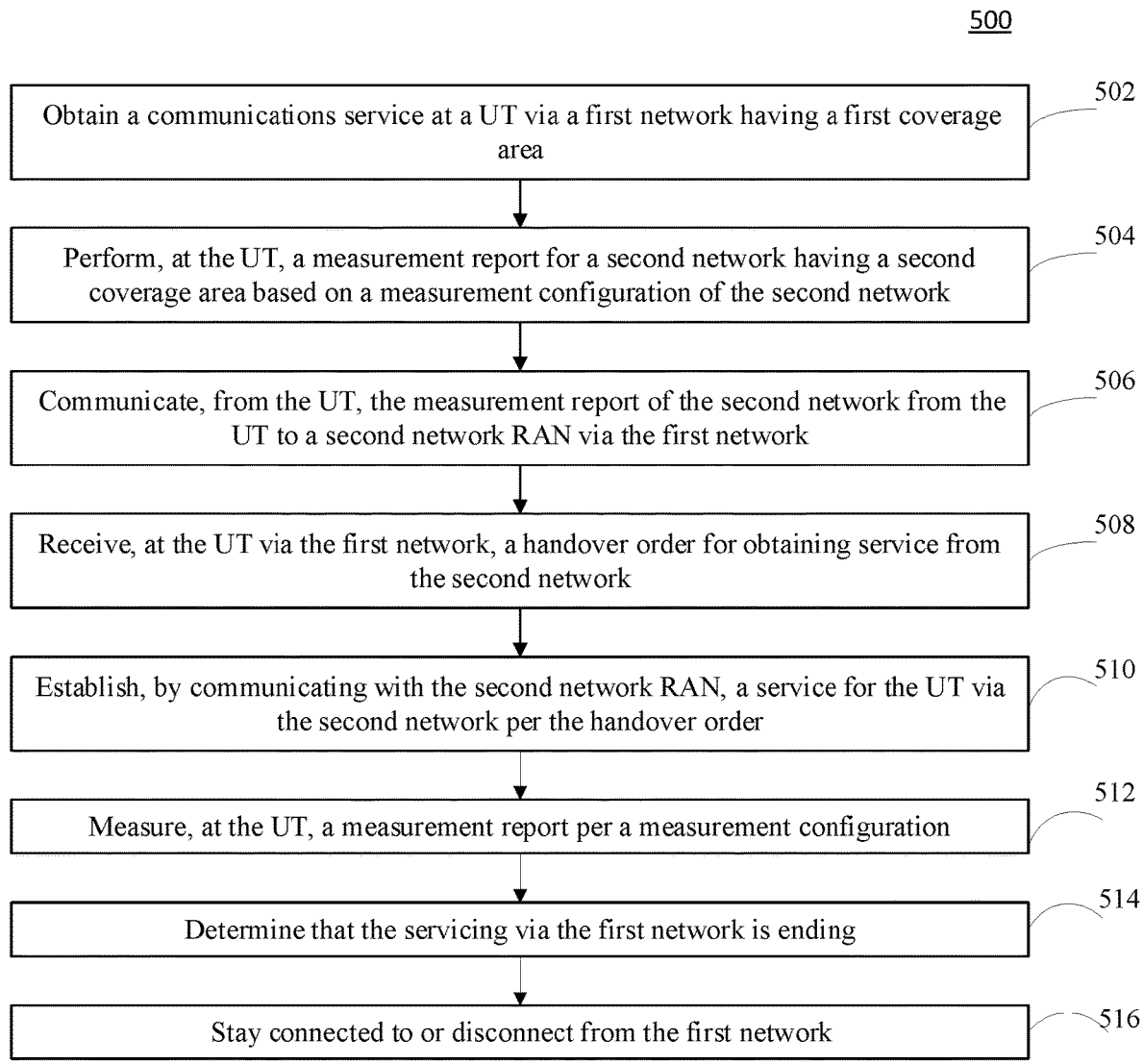
FIG. 5 illustrates a method for performing a handover in Radio Frequency (RF) networks at a UT, according to various embodiments.

FIG. 5 illustrates a method for performing a handover in Radio Frequency (RF) networks at a UT, according to various embodiments.

A method 500 for performing a handover of communications in RF networks at a UT. The RF networks may include a TN and an NTN. The method 500 may further include operation 502 to obtain a communications service at a UT via a first network having a first coverage area. The method 500 may further include operation 504 to perform, at the UT, a measurement report for a second network having a second coverage area based on a measurement configuration of the second network. The method 500 may further include operation 506 to communicate, from the UT, the measurement report of the second network from the UT to a second network RAN via the first network. The method 500 may further include operation 508 to receive, at the UT via the first network, a handover order for obtaining service from the second network. The method 500 may further include operation 510 to establish, by communicating with the second network RAN, a service for the UT via the second network per the handover order. The method 500 may further include operation 512 to measure, at the UT, a measurement report per a measurement configuration. The method 500 may further include operation 514 to determine that the servicing via the first network is ending. The method 500 may further include operation 516 to stay connected to or disconnect from the first network.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A non-transient computer-readable storage medium having instructions embodied thereon, the instructions being executable by one or more processors to perform a method for directing a handover of communications in Radio Frequency (RF) networks at a UT, the method comprising:
servicing a User Terminal (UT) via a first network having a first coverage area;
receiving, from the UT via the first network, a measurement report for a second network having a second coverage area based on a measurement configuration of the second network;
sending, to the UT via the first network, a handover order for obtaining service from the second network; and
establishing, via a second network RAN (Radio Access Network), a service for the UT via the second network per the handover order,
wherein the first network comprises either a Terrestrial Network (TN) or a Non-Terrestrial Network (NTN), the second network comprises other of the TN or the NTN, and the TN and the NTN are RF networks,
wherein the establishing is performed while the UT is disposed in an overlap area of the first coverage area and the second coverage area, and
wherein the measurement report comprises a RF signal metric of the second network at the UT.

2. The method of claim 1, wherein the TN comprises a cellular communications system.

3. The method of claim 1, wherein the NTN has a moving coverage area.

4. The method of claim 1, further comprising disconnecting from the first network after the establishing.

5. The method of claim 1, further comprising determining that the servicing via the first network is ending as the UT is imminently leaving the first coverage area.

6. The method of claim 1, further comprising determining that the second network is available or will be imminently available in the first coverage area.

7. The method of claim 1, further comprising determining that communicating with the UT via the second network benefits a network operator servicing the UT.

8. The method of claim 1, further comprising preventing hysteresis pursuant to the handover order.

9. The method of claim 1, wherein, when establishing communications via the second network, the servicing of the UT by the first network continues without interruption.

10. The method of claim 1, wherein, when establishing communications via the second network, the servicing of the UT by the first network continues without pause and without replication over the first network and the second network.

11. The method of claim 1, wherein the measurement report comprises a measurement gap and the method further comprises pausing the servicing of the UT by the first network during the measurement gap.

12. The method of claim 1, wherein the measurement configuration requests a management report when a relative movement vector between the UT and an antenna of the first network is non-zero.

13. The method of claim 1, wherein the measurement configuration requests a periodic measurement report.

14. The method of claim 1, wherein the measurement configuration comprises vertices, and the measurement report is based on measuring when a location of the UT is within the vertices.

15. The method of claim 14, wherein the location of the UT is approximated based on the first coverage area.

16. A non-transient computer-readable storage medium having instructions embodied thereon, the instructions being executable by one or more processors to perform a method for a handover of communications in Radio Frequency (RF) networks at a UT, the method comprising:
obtaining a communications service at a User Terminal (UT) via a first network having a first coverage area;
performing, at the UT, a measurement report for a second network having a second coverage area based on a measurement configuration of the second network;
communicating, from the UT, the measurement report of the second network from the UT to a second network RAN (Radio Access Network) via the first network;
receiving, at the UT, a handover order for obtaining service from the second network via the first network; and
establishing, by communicating with the second network RAN, a service for the UT via the second network per the handover order,
wherein the first network comprises either a Terrestrial Network (TN) or a Non-Terrestrial Network (NTN), the second network comprises other of the TN or the NTN, and the TN and the NTN are RF networks,
wherein the establishing is performed while the UT is disposed in an overlap area of the first coverage area and the second coverage area, and
wherein the measurement report comprises a RF signal metric of the second network at the UT.

17. The method of claim 16, further comprising determining that the obtaining of the communications service at the UT via the first network is ending as the UT is imminently leaving the first coverage area.

18. The method of claim 16, wherein the measurement configuration comprises vertices, and the performing comprises measuring, at the UT, when a location of the UT is within the vertices.

19. The method of claim 16, wherein after the establishing, the obtaining comprises obtaining the communication service at the UT with the first network and the second network.

20. The method of claim 16, further comprising disconnecting from the first network after the establishing.

\* \* \* \* \*